United States Patent
Phan (10) Patent No.: US 8,484,386 B2
(45) Date of Patent: Jul. 9, 2013

(54) SYSTEMS, METHODS AND DEVICES FOR MONITORING ENVIRONMENTAL CHARACTERISTICS USING WIRELESS SENSOR NODES

(75) Inventor: Nguyet Phan, Lynnwood, WA (US)

(73) Assignee: Intermec IP Corp., Everett, WA (US)

( * ) Notice: Subject to any disclaimer, the term of this patent is extended or adjusted under 35 U.S.C. 154(b) by 184 days.

(21) Appl. No.: 12/865,338

(22) PCT Filed: Jan. 27, 2009

(86) PCT No.: PCT/US2009/032128
§ 371 (c)(1),
(2), (4) Date: Jul. 29, 2010

(87) PCT Pub. No.: WO2009/099802
PCT Pub. Date: Aug. 13, 2009

(65) Prior Publication Data
US 2011/0002241 A1    Jan. 6, 2011

Related U.S. Application Data

(60) Provisional application No. 61/025,221, filed on Jan. 31, 2008.

(51) Int. Cl.
*G06F 3/00* (2006.01)
(52) U.S. Cl.
USPC .................................. 710/8; 710/10; 710/18
(58) Field of Classification Search
USPC ................................................ 710/8, 10, 18
See application file for complete search history.

(56) References Cited

U.S. PATENT DOCUMENTS

| 5,173,855 | A  | * | 12/1992 | Nielsen et al. ................ 700/284 |
| 7,305,467 | B2 |   | 12/2007 | Kaiser et al. |
| 2004/0028023 | A1 |   | 2/2004 | Mandhyan et al. |
| 2006/0109106 | A1 | * | 5/2006 | Braun ....................... 340/539.13 |
| 2006/0190458 | A1 | * | 8/2006 | Mishina et al. ................. 707/10 |
| 2007/0082677 | A1 |   | 4/2007 | Donald Hart et al. |
| 2007/0179671 | A1 | * | 8/2007 | Arimatsu et al. ............. 700/247 |
| 2009/0059842 | A1 |   | 3/2009 | Maltseff et al. |

FOREIGN PATENT DOCUMENTS

KR    100772989 B1    11/2007

OTHER PUBLICATIONS

International Search Report, mailed Jul. 22, 2009, for PCT/US2009/032128, 2 pages.
Written Opinion, mailed Jul. 22, 2009, for PCT/US2009/032128, 4 pages.

* cited by examiner

*Primary Examiner* — Farley Abad
(74) *Attorney, Agent, or Firm* — Seed IP Law Group PLLC (57) ABSTRACT

A wireless sensor node may be wirelessly registered with a first central node and may be automatically configured based at least in part on wireless communications with the first central node. The same wireless sensor node may subsequently be wirelessly registered with a second central node and may be automatically reconfigured based at least in part on wireless communications with the second central node. Environmental characteristics are detected using the wireless sensor node.

17 Claims, 6 Drawing Sheets

SYSTEMS, METHODS AND DEVICES FOR MONITORING ENVIRONMENTAL CHARACTERISTICS USING WIRELESS SENSOR NODES

CROSS REFERENCE TO RELATED APPLICATIONS

This application is a U.S. national stage application filed under 35 U.S.C. §371 of International Patent Application PCT/US2009/032128, accorded an international filing date of Jan. 27, 2009, which claims benefit under 35 U.S.C. 119(e) of U.S. Provisional Patent Application Ser. No. 61/025,221, filed Jan. 31, 2008 and entitled "Systems, Methods and Devices for Monitoring Environmental Characteristics Using Wireless Sensor Nodes"; both of which are incorporated herein by reference in their entirety.

BACKGROUND OF THE INVENTION

1. Technical Field

This description generally relates to the field of wireless sensor nodes, and more particularly to monitoring environmental characteristics using wireless sensor nodes.

2. Description of the Related Art

Networks built from small nodes with sensing and wireless communications capabilities may be used to collect data in a variety of environments. Each wireless sensor node is typically an autonomous device that detects or monitors environmental characteristics of its surrounding environment. These wireless sensor nodes may then be organized into networks for data collection and delivery.

Such networks may be used in the performance of a number of tasks, including monitoring manufacturing facilities, infrastructure or construction sites; monitoring food, electronics or other sensitive items; tracking documents; detecting changing weather conditions or early warning signs for natural disasters; monitoring for home automation; etc. The wireless sensor nodes may be positioned at precise locations or scattered randomly throughout the monitored environments to detect characteristics including: temperature, density, strain, deformation, acceleration, pressure, opacity, concentration, chemical state, resistance, mildew, phase changes, humidity, etc. The wireless sensor nodes may be periodically or continuously queried to obtain information regarding past or current environmental characteristics.

The individual wireless sensor nodes may range from "macro-sized" wireless sensor nodes, from the size of backpacks to roughly the size of a coin, to "micro-sized" sensor nodes, that can be the size of dust particles. These wireless sensor nodes may communicate wirelessly in a number of ways, but most commonly communicate via electromagnetic radiation (e.g., radio or microwave wavelengths).

In one implementation, each wireless sensor node may include a radio frequency identification ("RFID") transponder commonly referred to as an RFID tag. Such RFID tags typically employ an antenna coupled to a wireless transponder circuit to transmit and/or receive data via electromagnetic signals in some frequency range.

The wireless transponder circuit found in many RFID tags typically includes a memory portion and a logic portion. The memory portion stores data, while the logic portion controls the reading, writing, and manipulating of data in the memory portion. The logic portion may further couple between the memory portion and the antenna to act as a transmitter, receiver, or transceiver for reading and/or writing data to and/or from the RFID tags.

Active wireless sensor nodes may include a discrete consumable power source, such as a battery, to provide power to the wireless transponder circuit and the sensor. In contrast, passive wireless sensor nodes may derive power from a wireless interrogation signal, for example, by backscattering the signal as a response signal encoded with information from the wireless sensor node.

BRIEF SUMMARY

A method of operating a system to monitor environmental characteristics may be summarized as including: wirelessly registering a wireless sensor node with a first central node; automatically configuring the wireless sensor node based at least in part on wireless communications with the first central node; wirelessly registering the wireless sensor node with a second central node; automatically reconfiguring the wireless sensor node based at least in part on wireless communications with the second central node; and detecting environmental characteristics using the wireless sensor node.

A system to monitor a plurality of locations may be summarized as including: a first central node, a second central node and a wireless sensor node. The first central node may include a first central node processor that executes instructions; and a first central node memory that stores instructions that cause the first central node processor to: wirelessly register wireless sensor nodes; and receive data indicative of environmental characteristics detected by the registered wireless sensor nodes. The second central node may include a second central node processor that executes instructions; and a second central node memory that stores instructions that cause the second central node processor to: wirelessly register wireless sensor nodes; and receive data indicative of environmental characteristics detected by the registered wireless sensor nodes. The wireless sensor node may include a sensor that detects environmental characteristics; a sensor node processor that executes instructions; and a sensor node memory that stores instructions that cause the sensor node processor to: automatically configure the wireless sensor node based at least in part on wireless communications with the first central node; automatically reconfigure the wireless sensor node based at least in part on wireless communications with the second central node; and detect environmental characteristics.

A wireless sensor node to monitor environmental characteristics may be summarized as including: a sensor that detects environmental characteristics; a sensor node processor that executes instructions; and a sensor node memory that stores instructions. The instructions stored on the sensor node memory may cause the sensor node processor to: wirelessly register with a first central node; automatically configure the wireless sensor node based at least in part on wireless communications with the first central node; wirelessly register with a second central node; automatically reconfigure the wireless sensor node based at least in part on wireless communications with the second central node; and detect environmental characteristics.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Fur

DETAILED DESCRIPTION OF EMBODIMENTS OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with wireless sensor nodes, integrated circuits, antennas, radio frequency transmitters and receivers, networks, and wireless communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Exemplary System of Central Nodes and Wireless Sensor Nodes

Figure 1:
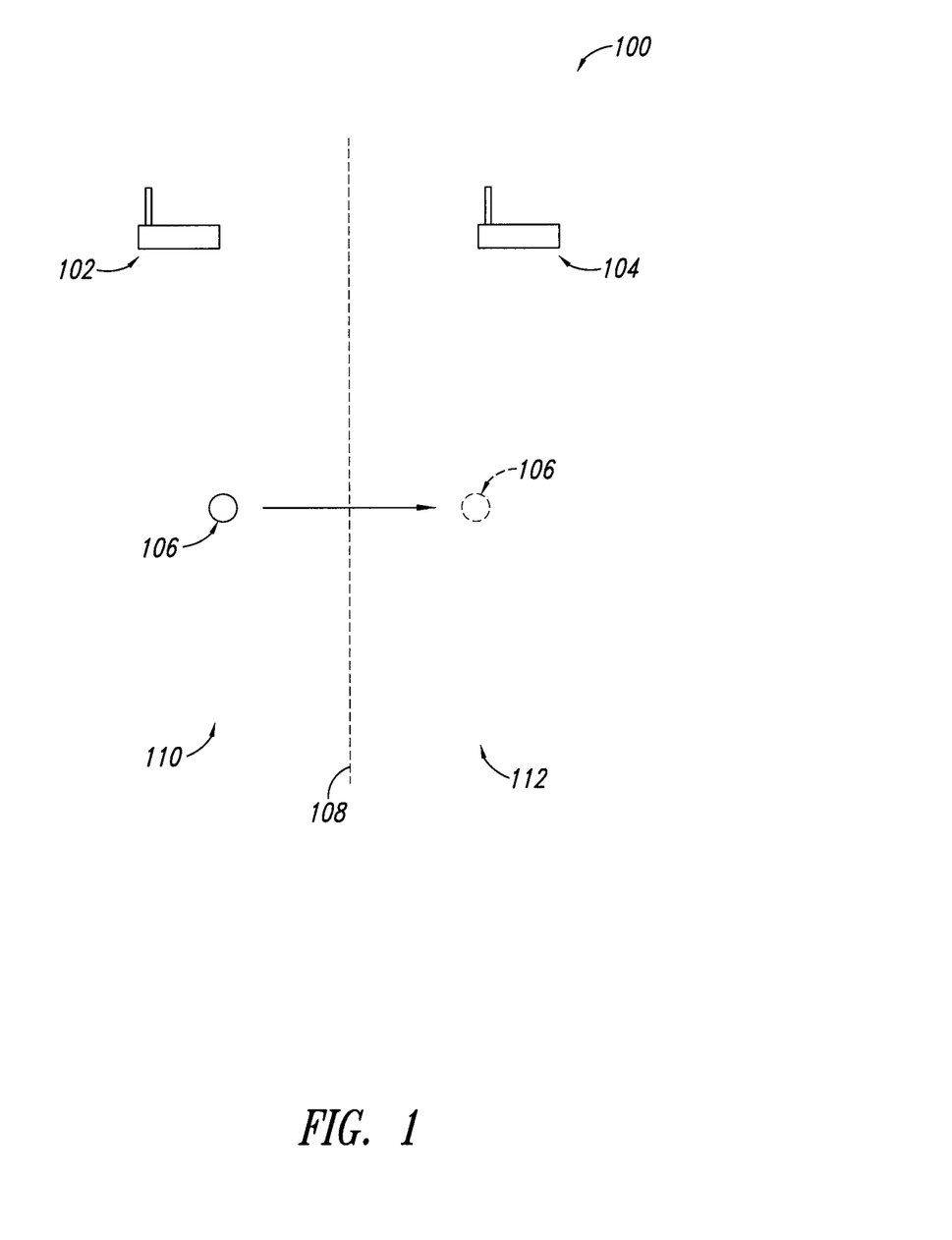
- FIG. 1 is a schematic view of a monitoring system including first and second central nodes and a wireless sensor node, according to one illustrated embodiment.

FIG. 1 shows a monitoring system 100 comprising a first central node 102, a second central node 104, and a wireless sensor node 106. Although only one wireless sensor node 106 is illustrated in FIG. 1, it may be understood that a plurality of wireless sensor nodes may interact with the central nodes 102, 104 in other embodiments.

In one embodiment, the first central node 102 functions as a central communications and information gathering hub for a first region 110 (e.g., an area, space or volume). The first central node 102 may wirelessly communicate with a number of different devices, including wireless sensor nodes (such as wireless sensor node 106), other central nodes, and wireless devices external to the monitoring system 100. In one embodiment, the first central node 102 may wirelessly communicate only with devices/nodes in the monitoring system 100 that are within the first region 110. The first central node 102 may thereby gather data from wireless sensor nodes as well as other central nodes within the first region 110, which data may represent environmental characteristics of the first region 110, other characteristics of items stored within the first region 110, capabilities of the wireless sensor nodes and other central nodes located within the first region 110, etc. Such data may be stored at the first central node 102 and may be subsequently accessed therefrom.

In other embodiments, the first central node 102 may also communicate with and form a network with central nodes located outside the first region 110. For example, as illustrated, the first central node 102 may communicate wirelessly (or via wires) with the second central node 104, and these central nodes 102, 104 may exchange data gathered from their respective regions 110, 112. In some embodiments, this data may then be forwarded to an access point from which a user may access and act upon the information.

In one embodiment, the first central node 102 may also communicate with wired or wireless devices external to the monitoring system 100. Such external devices (not shown) may be used to load data onto the first central node 102, such as information concerning items located within the first region 110 or firmware/software updates for the first central node 102. The external devices may also be used to access data stored on the first central node 102. For example, one of the external devices may include a screen for displaying the data received from the first central node 102 to a user. Such external devices may be further configured to carry out particular functions based on the data from the first central node 102. For example, if the first central node 102 gathers data indicative of high temperatures within the first region 110, then an external air conditioning system may respond to this data by cooling the space.

The first central node 102 may also be configured to act upon data gathered from the first region 110. For example, the first central node 102 may form part of a larger system for carrying out particular functions. In one embodiment, the first central node 102 may form part of a system for moving items into or out from the first region 110. The first central node 102 may also form part of an air conditioning system, a humidity control system, a pest control system, a filtration system, etc.

The second central node 104 may be configured similarly to the first central node 102 and may function as a central communications and information gathering and/or processing hub for a second region 112.

The first and second central nodes 102, 104 may comprise a variety of different structures, as discussed in greater detail below with respect to FIG. 5. In one embodiment, the first and second central nodes 102, 104 may each include a discrete consumable power source, such as a battery. In other embodiments, the first and second central nodes 102, 104 may be coupled to an external power source.

In one embodiment, each of the first and second central nodes 102, 104 may be configured similarly to an RFID wireless interrogator. For example, the central nodes 102, 104 may each include a wireless interface through which it can communicate with at least one wireless sensor node 106 via electromagnetic signals. The central nodes 102, 104 may each include an RFID circuit and may operate over a range of frequencies, such as 860-930 MHz, 2.45 GHz, or 5.8 GHz, which may correspond to the range of frequencies over which the wireless sensor node 106 is also operative. In other embodiments, the wireless interface may include other structures for communicating wirelessly with the wireless sensor node 106.

As illustrated, the first region 110 and the second region 112 are delineated by a dashed line 108, and may represent a variety of different two- or three-dimensional shapes. The regions 110, 112 may be distinguished in accordance with any of a number of logical or spatial features. In one embodiment, the size and shape of the regions 110, 112 may reflect the wireless capabilities of the central nodes 102, 104. For example, the first central node 102 may be unable to communicate with wireless sensor nodes beyond the first region 110, and the second central node 104 may be similarly unable to communicate with wireless sensor nodes beyond the second region 112. Alternatively, the size and shape of the regions 110, 112 may be determined based upon the relative strength of the wireless signals from the central nodes 102, 104. For example, if a wireless sensor node 106 receives a stronger signal from the first central node 102 than from the second central node 104, then the wireless sensor node 106 may be understood to be located within the first region 110.

The size and shape of the regions 110, 112 may also reflect physical structures. For example, the regions 110, 112 may represent different rooms of a house, different locations in an automobile, different chambers in a shipping container, etc. The regions 110, 112 may represent containers (logical or physical) that may store certain items, such as food, electronics, machinery, etc. In some embodiments, as discussed above, the corresponding central nodes may have stored therein information representative of the contents of these regions. For example, when a particular cargo is loaded within the first region 110, the first central node 102 may be configured to store information representative of that cargo. In still another embodiment, as discussed in greater detail below with respect to FIG. 3, the regions may be at least partially nested, one within the other.

The wireless sensor node 106 may comprise any of a variety of wireless sensor nodes and may coexist with a variety of homogenous or heterogeneous wireless sensor nodes. The wireless sensor node 106 may be configured to detect a particular environmental characteristic or characteristics. For example, in one embodiment, the wireless sensor node 106 may include a sensor for detecting electromagnetic energy. In another embodiment, the wireless sensor node 106 may detect temperature, and may include a digital or analog thermometer, sensor or thermocouple from which readings may be taken periodically, continuously, or upon request. In yet another example, the wireless sensor node 106 may detect humidity, and may include a digital or analog barometer from which readings may be taken periodically, continuously, or upon request. The wireless sensor node 106 may include any of a variety of sensors, including acoustic sensors, chemical or biological sensors, stress sensors, hardness sensors, mildew sensors, pressure sensors, mass sensors, acceleration sensors, resistance sensors, pH sensors, power sensors, radiation sensors, etc.

The wireless sensor node 106 may also include a wireless interface (e.g., a transmitter, receiver, transceiver or relay) via which the wireless sensor node 106 can communicate with the first or second central nodes 102, 104 and other wireless devices via electromagnetic signals. For example, the wireless sensor node 106 may include a wireless transponder circuit configured to exchange wireless signals with other wireless transponder circuits. In one embodiment, the wireless transponder circuit may be a RFID circuit and may operate over a range of frequencies, such as 860-930 MHz, 2.45 GHz, or 5.8 GHz. In other embodiments, the wireless interface may include other structures for communicating wirelessly with the first and second central nodes 102, 104.

In one embodiment, the wireless sensor node 106 may comprise an active RFID circuit having a discrete, consumable power source, such as a battery. The wireless sensor node 106 may rely upon this discrete power source to power both the sensor(s) described above as well as the wireless sensor node's internal circuitry. The wireless sensor node 106 may also include structures for autonomously scavenging power from their environment. For example, the wireless sensor node 106 may include solar cells and/or piezoelectric elements for transforming the energy in sunlight, vibratory forces, soundwaves, etc. into useful electrical current. Of course, passive RFID circuitry may be used in other embodiments depending on the requirements for the monitoring system 100. Regardless of the power source, the wireless sensor node 106 may be relatively low-powered (as it may be both small and wireless).

The wireless sensor node 106 may be configured to wirelessly communicate with both the first central node 102 and the second central node 104 (though not necessarily simultaneously). As discussed in greater detail below, during such communications, the wireless sensor node 106 may wirelessly register with one of the central nodes and automatically configure itself based at least in part on wireless communications with that central node. In one embodiment, the first and second central nodes 102, 104 may be configured to receive data indicative of environmental characteristics detected by the wireless sensor node 106.

To facilitate communication between the wireless sensor node 106 and the central nodes 102, 104, the wireless sensor node 106 and the central nodes 102, 104 may each be associated with an identifier. In one embodiment, the identifier may comprise a numerical identifier stored on the wireless device during manufacturing. For example, a numerical identifier may be stored on read-only memory within the wireless sensor node 106. In another embodiment, the identifier for each wireless device may be variable and may be generated during a network association process. This network association process may be completed once, at the formation of the monitoring system 100, and/or may be updated periodically. In one example, other network association processes may be used, such as that disclosed in co-pending U.S. patent application Ser. No. 11/848,121, filed Aug. 30, 2007, titled "SYSTEMS, METHODS, AND DEVICES THAT DYNAMICALLY ESTABLISH A SENSOR NETWORK," the contents of which are hereby incorporated by reference herein in their entirety.

In one embodiment, the wireless sensor node 106 is configured to be moved between regions and reused. For example, as illustrated in FIG. 1, the wireless sensor node 106 may first register with the first central node 102, while the wireless sensor node 106 is located within the first region 110. The wireless sensor node 106 may also be automatically configured based at least in part on wireless communications with the first central node 102. For example, the wireless sensor node 106 may be configured to detect particular environmental characteristics or may be configured to trigger certain events when those environmental characteristics reach set limits. The wireless sensor node 106 may then be moved to a location within the second region 112 (shown by the dashed wireless sensor node in FIG. 1). Once moved, the wireless sensor node 106 may wirelessly register with the second central node 104 and may be automatically reconfigured based at least in part on wireless communications with the second central node 104. The wireless sensor node 106 may then be configured to detect different environmental characteristics or to trigger different events.

Thus, the wireless sensor node 106 may be deployed and reused in a variety of different environments with a variety of different central nodes and configured and reconfigured to work within the parameters of the current deployment. The wireless sensor node 106 may, for example, be used in shipping applications (e.g., shipping containers, shipping crates, shipping boxes), home automation applications (e.g., refrigerators, grocery bags, ovens, rooms, exterior applications), warehousing/manufacturing operations (e.g., shop floors, machine monitoring, storage monitoring), etc.

Figure 2:
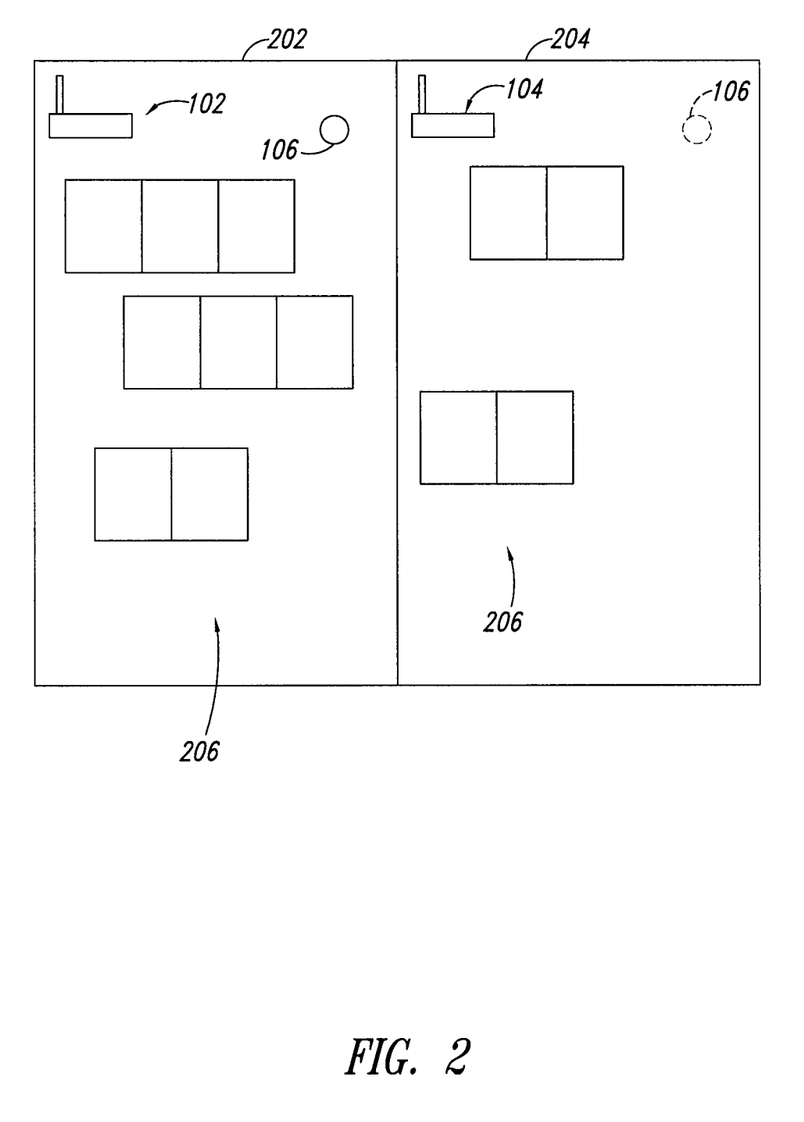
FIG. 2 is a schematic view of a plurality of shipping containers including first and second central nodes and a wireless sensor node, according to one illustrated embodiment.

Description of Shipping Containers Including Central Nodes and Wireless Sensor Nodes As illustrated by the schematic representation of FIG. 2, in one embodiment, the first central node 102 may be associated with a first region defined by a first shipping container 202, and the second central node 104 may be associated with a second region defined by a second shipping container 204. In FIG. 2, the first central node 102 is illustrated as positioned in a corner of the first shipping container 202. However, in other embodiments, the first central node 102 may be affixed to a top or side wall nearer the center of the first shipping container 202 to maximize the first central node's wireless communication abilities within the first shipping container 202. The location of the second central node 104 may be similarly chosen to ensure robust wireless communication within the second shipping container 204.

In one embodiment, the first and the second shipping containers 202, 204 may be metallic, and thus wireless communication between the containers may be effectively prevented. The metallic walls of the first and the second shipping containers 202, 204 may thereby define the boundaries of the first and second regions associated with the first and second central nodes 102, 104. In such an embodiment, interference between the first and second central nodes 102, 104 may be avoided regardless of the placement of the nodes 102, 104. In other embodiments, the first and the second shipping containers 202, 204 may comprise other materials, and the first and second regions may be defined in some other manner.

Each of the shipping containers 202, 204 may contain a number of shipping boxes 206 or other items, illustrated schematically in FIG. 2. In one embodiment, the shipping boxes 206 and/or items carried within or outside of the shipping boxes 206 may be sensitive to one or more environmental variables. For example, the items in the shipping containers 202, 204 may be sensitive to high or low temperatures, high or low humidity, changes in temperature, changes in humidity, mold/mildew, atmospheric chemicals, etc.

The first and the second shipping containers 202, 204 may, of course, carry different items. In one embodiment, for example, the first shipping container 202 may contain computer-related hardware, while the second shipping container 204 may contain foodstuffs. As a result, although both shipping containers 202, 204 may be sensitive to high temperatures, the first shipping container 202 may be associated with a first temperature range, and the second shipping container 204 may be associated with a second temperature range differing from the first temperature range.

At least one wireless sensor node 106 may be positioned in one of the shipping containers 202, 204 and may be configured to detect any of a variety of environmental characteristics associated with the respective shipping container and/or the items located therein. The wireless sensor node 106 may then transmit data representative of such environmental characteristics to a corresponding central node 102 or 104.

In one embodiment, the wireless sensor node 106 may be positioned in the first shipping container 202. The wireless sensor node 106 may be affixed to one of the walls of the first shipping container 202, may be placed loosely within the first shipping container 202, or may be affixed to or contained within one of the items placed within the first shipping container 202. After wirelessly registering with the first central node 102, the wireless sensor node 106 may be configured to set a first temperature limit corresponding to the first temperature range associated with computer-related hardware. In one embodiment, the wireless sensor node 106 may receive data representative of the first temperature limit from the first central node 102 upon registration.

Based on the first temperature limit, the wireless sensor node 106 may carry out any of a variety of actions. In one embodiment, the wireless sensor node 106 may notify the first central node 102 when a detected temperature exceeds the first temperature limit. In another embodiment, a temperature sensitivity range of the wireless sensor node 106 may be recalibrated based at least in part on the first temperature limit. In yet another embodiment, the wireless sensor node 106 may record temperature readings that exceed the first temperature limit.

The wireless sensor node 106 may be subsequently moved from the first shipping container 202 to the second shipping container 204. After wirelessly registering with the second central node 104, the wireless sensor node 106 may be reconfigured to set a second temperature limit corresponding to the second temperature range associated with foodstuffs. In one embodiment, the wireless sensor node 106 may receive data representative of the second temperature limit from the second central node 104 upon registration. Based on the second temperature limit, the wireless sensor node 106 may carry out any of a variety of actions, including those discussed above.

Of course, while discussed above in the context of temperature readings, any of a variety of environmental variables may be detected by the wireless sensor node 106 in different applications. In addition, a plurality of wireless sensor nodes may be located within both the first and the second shipping containers 202, 204 to simultaneously monitor a variety of environmental characteristics. Such measurements may be used during transit of the shipping containers 202, 204 or may be accessed upon arrival at a destination.

Figure 3:
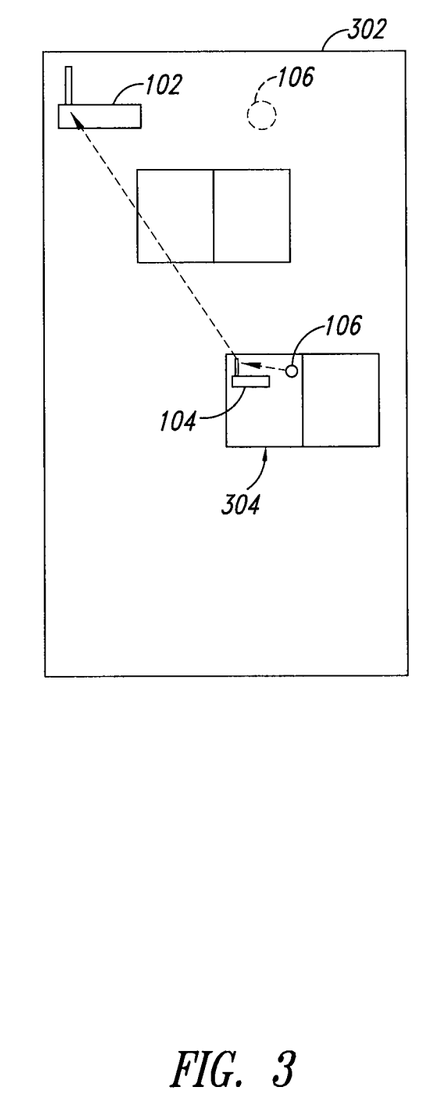
FIG. 3 is a schematic view of a shipping container including first and second central nodes and a wireless sensor node, according to another illustrated embodiment.

Description of a Nested Monitoring System of Central Nodes and Wireless Sensor Nodes As illustrated in FIG. 3, a nested arrangement for the monitoring system may also be used. In one embodiment, the first central node 102 may be associated with a shipping container 302 and may function as a "parent" central node. The second central node 104 may also be located within the shipping container 302 and may be associated with a shipping box 304 within the shipping container 302. In such an arrangement, the second central node 104 may function as a "child" central node.

As used herein, "parent" and "child" are relative terms. A parent central node is associated with a larger region containing within it a smaller region associated with another central node (i.e., a child central node). In such an arrangement, the child central node may gather information from within the smaller region and forward that information on to the parent central node upon request. A parent central node may be associated with a number of children, and, of course, the parent central node may, in turn, be a child central node with respect to another central node. In certain embodiments, parent central nodes may be more robust as they are associated with more and more children and grandchildren. For example, a parent central node may have more processing power, access to greater functionality, a larger memory, etc. in order to function as a consolidating device for information from child central nodes.

In one embodiment, the second central node 104 may receive data indicative of detected environmental characteristics from the wireless sensor node 106 and/or other wireless sensor nodes and child central nodes located within the shipping box 304. In turn, the second central node 104 may transmit such data on to the first central node 102. The first central node 102 may thus receive data from the second central node 104, in addition to data from other wireless sensor nodes and child central nodes located within the shipping container 302. Upon receiving this information, the first central node 102 may perform any of a number of operations or may simply store this information for later access.

As discussed at length above, the wireless sensor node 106 may also be reused and redeployed, such that, in one embodiment, it may be moved from within the shipping box 304 to another location within the shipping container 302 (illustrated in outline form). Thus, the wireless sensor node 106 may be moved from a first location (i.e., within the shipping box 304) associated with both the first central node 102 and the second central node 104, to a second location (i.e., within the shipping container 302 but outside the shipping box 304) associated only with the first central node 102.

In one embodiment, by employing the above-described nested arrangement, wireless sensor nodes may be positioned more closely to at least one central node. As a result, the wireless sensor nodes may have lower power requirements for wireless transmission, thereby conserving battery life. Instead, longer-distance wireless communication may be handled primarily by the central nodes, which may be relatively high-powered in comparison with the wireless sensor nodes.

The nesting arrangement for central nodes may be deployed in a variety of different environments. For example, a storage bag may include one or more wireless sensor nodes and a central node. The storage bag may then be placed in a larger area associated with a parent central node, such as a refrigerator, a garage, a supermarket, etc. In another embodiment, a refrigerator may include a number of different wireless sensor nodes and a central node. The central node may monitor food expiration, food depletion (e.g., via weight sensors), mold/moisture content via the wireless sensor nodes, and may report these to a parent central node associated with a person's kitchen or house.

Description of Exemplary Protocols for Wireless Communication

In order to facilitate wireless communication between the wireless sensor nodes and central nodes, any of a variety of sensor node-central node protocols may be used. In one embodiment, the protocol may include the following messages, among others:

Get_Central_Node—Returns the central node with which the wireless sensor node is currently associated.

Get_Sensor_Type—Returns the type(s) of sensor(s) in the wireless sensor node.

Get_Sensor_Info (Info_ID(in), Info_Data(out))—Given an identifier for requested environmental data, a message might be returned from the wireless sensor node containing the requested data or an error.

Register_Sensor_Info—Registers the central node for a specific sensor event, upon which the wireless sensor node will notify the central node.

As discussed above, in one embodiment, the central nodes 102, 104 may be further configured to communicate with each other or with other, external wireless devices. For example, an external query may be made to one or more of the central nodes 102, 104 to obtain environmental characteristics of an associated area. Although any of a variety of central node protocols may be used, in one embodiment, the protocol may include the following messages, among others:

Set_ID—Sets a central node identifier.

Get_ID—Returns the central node identifier.

Set_Name—Sets a name of an area associated with the central node.

Get_Name—Returns the name of the area associated with the central node.

Set_Description—Sets a description of the area associated with the central node.

Get_Description—Gets a description of the area associated with the central node.

Set_Content_Name—Sets a name for content stored in the area.

Get_Content_Name—Gets the name for the content stored in the area.

Set_Content_Description—Sets a description of the content stored in the area.

Get_Content_Description—Gets a description of the content stored in the area.

Add_Intelligence—Registers a wireless sensor node with the central node.

Get_Intelligence—Returns a list of all wireless sensor nodes that are registered with the central node.

Get_Parent_Node—Returns an identifier for the parent central node of the current central node (if nested).

Get_Child_List—Returns identifiers for child central nodes of the current central node (if nested).

Detailed Description of an Exemplary Wireless Sensor Node

Figure 4:
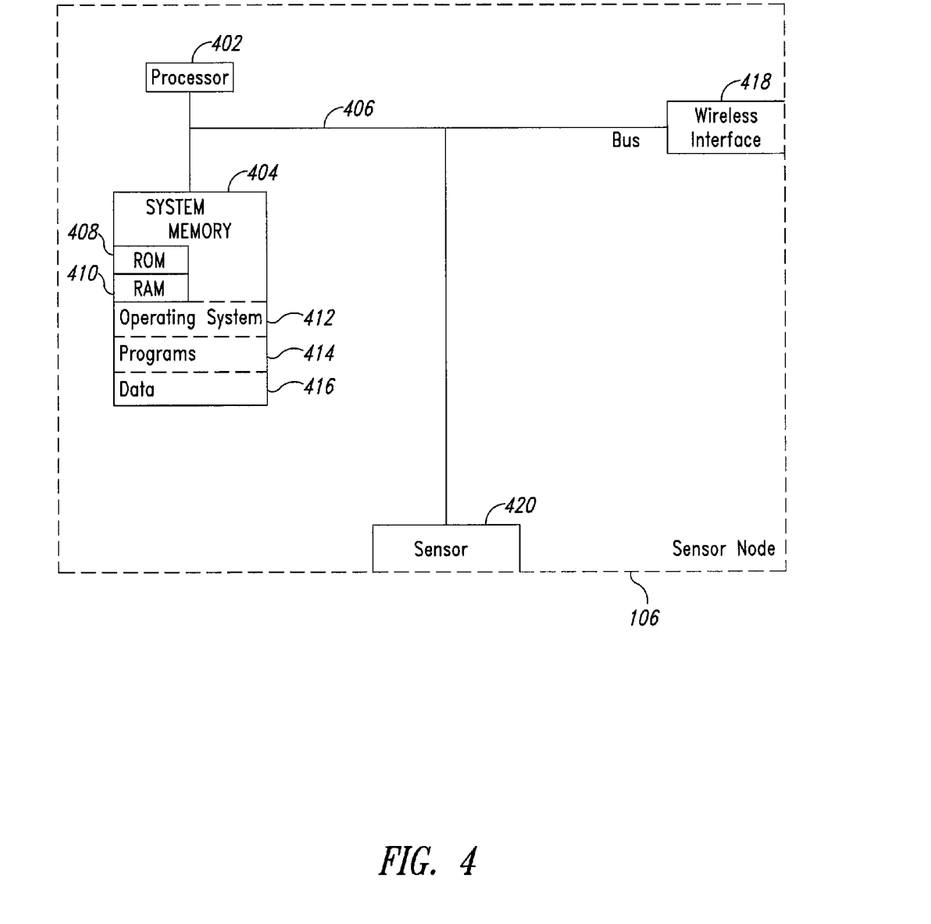
FIG. 4 is a schematic view of a wireless sensor node, according to one illustrated embodiment.

FIG. 4 is a schematic diagram of an exemplary wireless sensor node 106. Although not required, the embodiments below will be described in the general context of computer-executable instructions, such as program modules, objects, or macros being executed by a processor. Those skilled in the relevant art will appreciate that the illustrated embodiments as well as other embodiments can be practiced with other wireless sensor configurations, including handheld devices, microprocessor-based or programmable consumer electronics, personal computers ("PCs"), and the like.

The wireless sensor node 106 may include a processor, controller or other logic unit 402, a system memory 404 and a system bus 406 that couples various system components including the system memory 404 to the processor 402.

The processor 402 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 4 are of conventional design. As a result, such blocks need not be described in further detail herein, as they will be understood by those skilled in the relevant art.

The system bus 406 can employ any known bus structures or architectures, including a memory bus with memory controller, a peripheral bus, a local bus, an instruction bus, a data bus, and/or a power bus. The system memory 404 may include read-only memory ("ROM") 408 and random access memory ("RAM") 410. The wireless sensor node 106 may also include a more permanent form of memory or other computer-readable media, such as flash memory, hard disk drives, smart cards, etc. (not shown).

Program modules can be stored in the system memory 404, such as an operating system 412, one or more programs 414 and data 416 (program data, sensor data, identifier data, etc.).

The wireless sensor node 106 may operate in a networked environment via a wireless interface 418 to communicate with one or more wireless devices. In one embodiment, the wireless interface 418 may include wireless transponder circuitry for wireless communication. Generally, the wireless transponder circuitry may function to receive and transmit wireless signals. In some embodiments, the wireless transponder circuitry may transmit electromagnetic signals when actuated or probed by a signal from a wireless interrogator. For example, if the wireless sensor node 106 comprises an active RFID device, then the wireless transponder circuitry may facilitate communication in the radio frequency band. In other embodiments, other frequencies may be used by the wireless interface for communication.

A sensor 420 may also be coupled to the bus 406 in the wireless sensor node 106. The sensor 420 may be any suitable sensing device for detecting and/or monitoring environmental characteristics. In one embodiment, the sensor 420 may be chosen to operate on very little power, and in severe environmental conditions. For example, a silicon-based micro-electromechanical system (MEMS) may be employed. MEMS may serve as pressure sensors, accelerometers, strain gauges, etc. By using a MEMS device, the wireless sensor node 106 may achieve robust environmental sensing using very little power.

The operating system 412 and/or the programs 414 of the wireless sensor node 106 may query the sensor 420 at periodic intervals to detect one or more environmental characteristics. Data representative of these environmental characteristics may then be stored in the system memory 416 or in a more robust, long-term memory. In other embodiments, the wireless sensor node 106 may generate data based on detected environmental characteristics upon receiving a data request through the wireless interface 418. In yet another embodiment, the sensor 420 may trigger interrupts in the processor 402 upon the occurrence of certain environmental events, which interrupts may then cause the processor 402 to store data representative of such environmental events.

Detailed Description of an Exemplary Central Node

Figure 5:
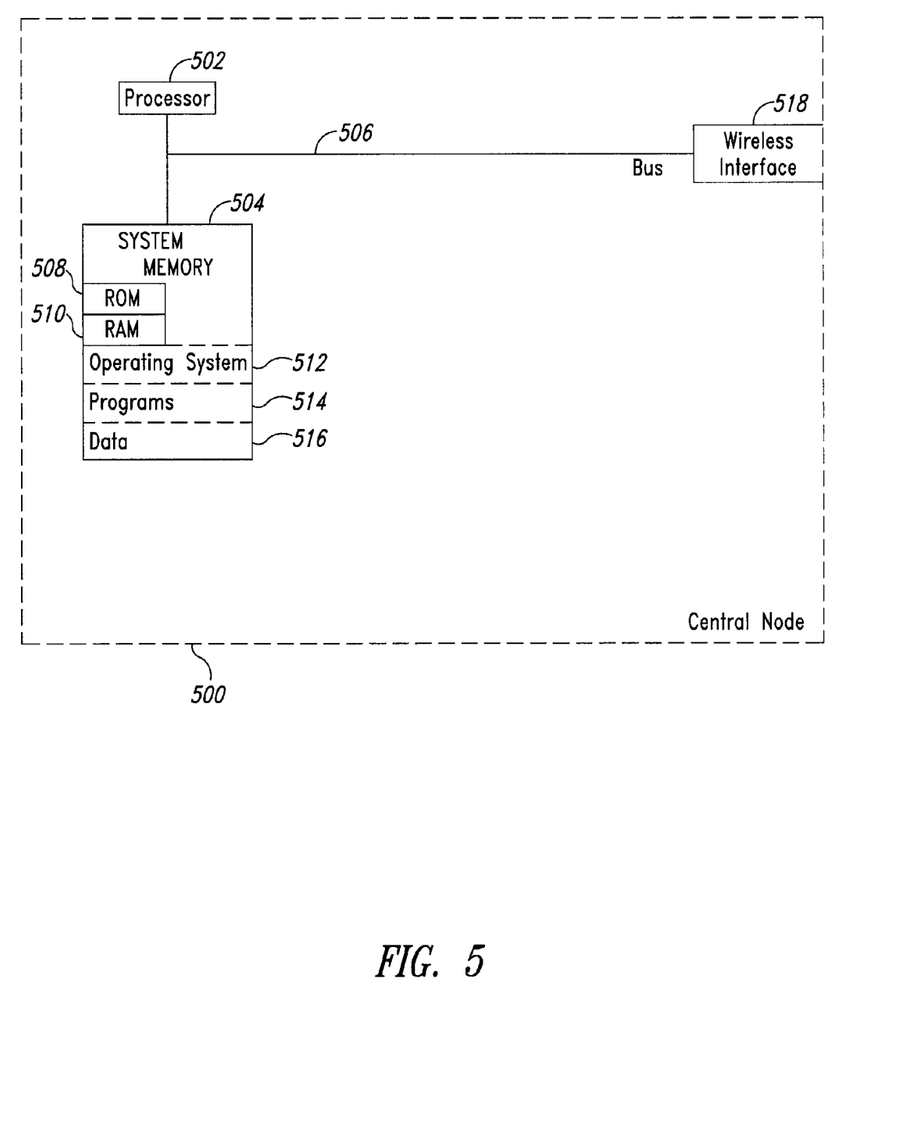
FIG. 5 is a schematic view of a central node, according to one illustrated embodiment.

FIG. 5 is a schematic diagram of an exemplary central node 500. Although not required, the embodiments will be described in the general context of computer-executable instructions, such as program modules, objects, or macros being executed by a processor. Those skilled in the relevant art will appreciate that the illustrated embodiments as well as other embodiments can be practiced with other wireless device configurations, including handheld devices, personal digital assistants, cellphones, microprocessor-based or programmable consumer electronics, personal computers ("PCs"), and the like.

The central node 500 may include a processor or other logic unit 502, a system memory 504 and a system bus 506 that couples various system components including the system memory 504 to the processor 502.

The processor 502 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 5 are of conventional design. As a result, such blocks need not be described in further detail herein, as they will be understood by those skilled in the relevant art.

The system bus 506 can employ any known bus structures or architectures, including a memory bus with memory controller, a peripheral bus, a local bus, an instruction bus, a data bus, and/or a power bus. The system memory 504 may include read-only memory ("ROM") 508 and random access memory ("RAM") 510. The central node 500 may also include a more permanent form of memory or other computer-readable media, such as flash memory, hard disk drives, smart cards, etc. (not shown). In one embodiment, the central node may further include a display (not shown) to facilitate interaction with a user.

Program modules can be stored in the system memory 504, such as an operating system 512, one or more programs 514 and data 516 (program data, identifier data, etc.).

The central node 500 may operate in a networked environment via a wireless interface 518 to communicate with one or more wireless devices. In one embodiment, the wireless interface 518 may function as a wireless interrogator for wireless communication. The wireless interface may transmit and receive wireless signals in any of a variety of frequency ranges. In one embodiment, the operative range of the central node 500 may be chosen to overlap the operative range of the wireless sensor node 106.

The operating system 512 and/or the programs 514 may formulate and send data requests to the monitoring system 100. In one embodiment, for example, the operating system 512 and/or the programs 514 may be configured to wirelessly register wireless sensor nodes. In another embodiment, such data requests may request data indicative of one or more environmental characteristics detected by sensors in the wireless sensor node 106 (e.g., using the protocols set out above). In some embodiments, the data requests may be generated and transmitted automatically by a program 514; however, in other embodiments, the data requests may be generated and transmitted based on user input. For example, a user may interact with the central node 500 via one or more input devices (not shown) in order to request one or more types of data. The central node 500 may also send to the wireless sensor node 106 data representative of desired limits for particular environmental variables that may be detected by the wireless sensor node 106.

Description of an Exemplary Method for Monitoring Environmental Characteristics

Figure 6:
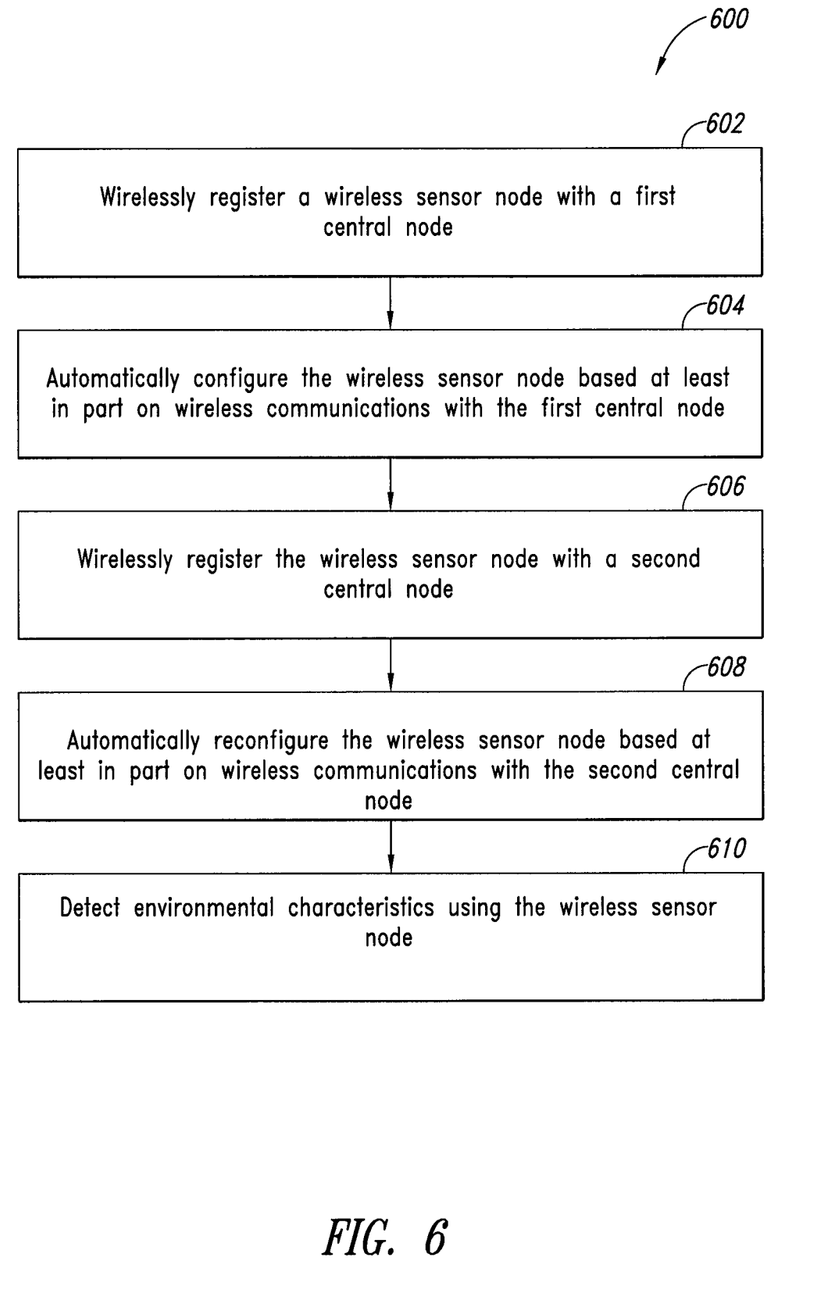
FIG. 6 is a flow diagram illustrating a method for monitoring environmental characteristics, according to one illustrated embodiment.

FIG. 6 illustrates a flow diagram for a method 600 of monitoring environmental characteristics, according to one embodiment. This method 600 will be discussed in the context of the monitoring system 100 of FIG. 1. However, it may be understood that the acts disclosed herein may also be executed using a variety of systems including central nodes and at least one wireless sensor node, including any of those discussed above, in accordance with the described method.

The method begins at 602, when a wireless sensor node 106 wirelessly registers with a first central node 102. As described above, the wireless sensor node 106 may be positioned in a first region associated with the first central node 102. The wireless sensor node 106 may be releasably affixed in the first region, or otherwise positioned therein. In one embodiment, the wireless sensor node 106 may accompany items stored within the first region, and may be removed and replaced therewith.

The process of wireless registration may take place in accordance with any of a number of techniques. In one embodiment, the wireless sensor node 106 may simply send an identifier to the first central node 102, and the first central node 102 may acknowledge this wireless registration request with a registration response. In another embodiment, the wireless sensor node 106 may otherwise indicate its presence to the first central node 102. The first central node 102 may, in turn, respond with its own identifier. In yet another embodiment, a number of central nodes may establish wireless communications with the wireless sensor node 106, and the wireless sensor node 106 may choose among them (e.g., based upon signal strength). Alternatively, the wireless sensor node 106 may broadcast a message to a number of central nodes, and the central nodes may choose among themselves to determine with which central node the wireless sensor node 106 should become registered.

During registration, the wireless sensor node 106 may be configured to store information indicative of the first central node 102, such as a name, identifier, or another description corresponding to the first central node 102. Similarly, the first central node 102 may store information indicative of the wireless sensor node 106. In addition, the first central node 102 may store information indicative of capabilities of the wireless sensor node 106. For example, the first central node 102 may populate a table with the different sensing capabilities of all wireless sensor nodes currently registered with the first central node 102.

At 604, the wireless sensor node 106 may automatically configure itself based at least in part on wireless communications with the first central node 102. In one embodiment, the wireless sensor node 106 may be configured based at least in part on the wireless registration process discussed above. In another embodiment, the wireless sensor node 106 may receive other wireless communications from the first central node 102 indicative of how the wireless sensor node 106 should be configured, such as the above-mentioned Register_Sensor_Info command.

The wireless sensor node 106 may adopt a new configuration in a variety of ways. For example, in one embodiment, the wireless sensor node 106 may include a plurality of sensors, and the configuration may include activating selected ones of the plurality of sensors. In another embodiment, the wireless sensor node 106 may be configured to take environmental measurements at particular times or at particular intervals. These measurement intervals may be selected, for example, to conserve battery life. In another embodiment, the wireless sensor node 106 may be configured to record environmental characteristics above or below a certain limit. In still another embodiment, the wireless sensor node 106 may be configured to set a first limit associated with detected environmental characteristics. The wireless sensor node 106 may receive data representative of this first limit from the first central node 102. For example, the wireless sensor node 106 may set a high temperature limit associated with a limit at which items may spoil. Upon reaching this high temperature limit, the wireless sensor node 106 may then be configured to notify the first central node 102. In yet another embodiment, the wireless sensor node 106 may be configured to recalibrate one or more of its sensors based upon an expected sensing range.

Data representative of the desired configuration may be formatted and transmitted from the first central node 102 to the wireless sensor node 106 according to any of a variety of low-level and high-level protocols. For example, in one embodiment, the data may be formatted according to 802.11x requirements, wireless USB specifications, RFID specifications, the above protocol commands, etc. In some embodiments, the data may be formatted and transmitted without error-detection/error-correction schemes in order to conserve power. For example, error-correcting codes, data redundancy and other common methods for ensuring an accurate transmission may be omitted in favor of a shorter, less certain transmission.

In one embodiment, the configuration data may be encoded as an element from a lookup table. For example, both the wireless sensor node 106 and the first central node 102 may include similar lookup tables with codes corresponding to potential configuration data. The first central node 102 may then simply transmit a simple numerical code to the wireless sensor node 106. In one embodiment, this higher-level abstraction enables the first central node 102 to transmit and receive relatively short wireless messages, conserving energy expended by the wireless interfaces of the wireless sensor node 106 and the first central node 102. In another embodiment, the configuration data may be formulated in a more generic coding language in order to formulate configuration data not contemplated during the creation of the lookup tables.

At 606, the wireless sensor node 106 may be wirelessly registered with a second central node 104. In one embodiment, the wireless sensor node 106 is moved from a first region 110 associated with the first central node 102 to a second region 112 associated with the second central node 104, as shown by the arrow in FIG. 1. In another embodiment, the central nodes may instead be swapped out, such that the wireless sensor node 106 must register with the second central node 104. In yet another embodiment (as illustrated in FIG. 3), the wireless sensor node 106 may be moved from a first region associated with both the first and the second central nodes (e.g., a shipping box, where it is registered with the first central node) to a second region associated only with the second central node (e.g., a shipping container outside the shipping box, where it is registered with the second central node).

The process of wireless registration with the second central node 104 may be carried out similarly to that described above with respect to the wireless registration with the first central node 102.

In one embodiment, the wireless sensor node 106 may de-register with the first central node 102 as it is moved from the first region 110. It may perform this de-registration process automatically (e.g., based on the strength of a wireless signal from the first central node 102) or based on a manual command. In other embodiments, the first central node 102 may periodically poll the wireless sensor nodes associated therewith and may thereby determine which wireless sensor nodes are currently accessible.

At 608, the wireless sensor node 106 may be automatically reconfigured based at least in part on wireless communications with the second central node 104. This configuration process may take place in a manner similar to that described above with reference to act 604. For example, in one embodiment, the wireless sensor node 106 may set a second limit associated with detected environmental characteristics, the second limit differing from a first limit previously set while in wireless communication with the first central node 102. The wireless sensor node 106 may, for example, receive data representative of the second limit from the second central node 104. This may facilitate reuse/recycling of the wireless sensor node 106 in different environments, in communication with different central nodes.

At 610, the wireless sensor node 106 may detect environmental characteristics. As discussed above, the wireless sensor node 106 may include at least one sensor and may detect environmental characteristics when registered with the first central node 102 as well as when registered with the second central node 104.

In one embodiment, the detected environmental characteristics may correspond to a region associated with one of the first or the second central nodes 102, 104, and more particularly to items positioned in that region. For example (as illustrated in FIG. 2), the first central node 102 may be associated with a first shipping container, and the second central node 104 may be associated with a second shipping container. The detected environmental characteristics may then correspond to items stored in the first shipping container and the second shipping container. In another embodiment, the first central node 102 may be associated with a refrigerator, and the second central node 104 may be associated with a house containing the refrigerator. In such an embodiment, the detected environmental characteristics may correspond to food located within the refrigerator, which may be reported from the first central node 102 to the second central node 104.

In one embodiment, the wireless sensor node 106 may transmit data indicative of the detected environmental characteristics to the first central node 102 and to the second central node 104, as appropriate. As described above, the wireless sensor node 106 may also notify the first central node 102 when the detected environmental characteristics exceed a first limit set by and/or associated with the first central node 102. The wireless sensor node 106 may also notify the second central node 104 when the detected environmental characteristics exceed a second limit set by and/or associated with the second central node. Such environmental characteristics may represent, for example, time, weight, pressure, temperature, humidity, light, mildew, chemical presence, etc.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any processor-related system or method. In the context of this document, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a nonexhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A method of operating a system to monitor environmental characteristics comprising:
registering a plurality of wireless sensor nodes with a first central node, the first central node functioning as a communications and information gathering hub for a first region, wherein all of the registering with the first central node is via direct wireless communications with the first central node without reliance on intermediate sensor nodes to relay information; and
for each wireless sensor node:
automatically configuring the wireless sensor node based at least in part on wireless communications with the first central node, including setting a first limit and a second limit differing from the first limit, the first ad second limits associated with the detected environmental characteristics;
registering the wireless sensor node with a second central node, the second central ode function a communications and information hub for a second region, wherein all of the registering with the second central node is via direct wireless communications with the second central node without reliance on intermediate sensor nodes to relay information;
automatically reconfiguring the wireless sensor node based at least in part on wireless communications with the second central node;
detecting environmental characteristics using the wireless sensor node;
notifying the first central node when the detected environmental characteristics exceed the first limit; and
notifying the second central node when the detected environmental characteristics exceed the second limit.

2. The method of claim 1, further comprising:
receiving data representative of the first limit at the wireless sensor node from the first central node; and
receiving data representative of the second limit at the wireless sensor node from the second central node.

3. The method of claim 1, further comprising:
positioning the wireless sensor node in the first region associated with the first central node; and
moving the wireless sensor node from the first region to the second region associated with the second central node.

4. The method of claim 3 wherein the first region is associated with both the first central node and the second central node, and the second region is associated with the second central node and not the first central node.

5. The method of claim 4 wherein the first central node wirelessly receives data indicative of the detected environmental characteristics from the wireless sensor node and wirelessly transmits the data indicative of the detected environmental characteristics to the second central node.

6. The method of claim 1, further comprising:
transmitting data indicative of the detected environmental characteristics to the first central node; and
transmitting data indicative of the detected environmental characteristics to the second central node.

7. The method of claim 1 wherein the detected environmental characteristics include at least one of time, weight, pressure, temperature, humidity, light, mildew, radiation and chemical presence.

8. The method of claim 1 wherein the first central node is associated with a first shipping container, and the second central node is associated with a second shipping container.

9. The method of claim 8 wherein the detected environmental characteristics are associated with items stored in the first shipping container and the second shipping container.

10. A system to monitor a plurality of locations, the
a first central node that functions as a communications and information gathering hub for a first region, the first central node having:
a first central node processor that executes instructions; and
a first central node memory that stores instructions that cause the first wirelessly register wireless sensor nodes; and
receive data indicative of environmental characteristics detected by the registered wireless sensor nodes;
a second central node that functions as a communications and information gathering hub for a second region, the second central node having:
a second central node processor that executes instructions; and
a second central node memory that stores instructions that cause the second central node processor to:
wirelessly register wireless sensor nodes; and
receive data indicative of environmental characteristics detected by the registered wireless sensor nodes; and
a plurality of wireless sensor nodes each node having:
a sensor that detects environmental characteristics;
a sensor node processor that executes instructions; and
a sensor node memory that stores instructions that cause the sensor node processor to:
automatically configure the wireless sensor node based a part on wireless communications with the first central node;
automatically reconfigure the wireless sensor node based at least in part on wireless communications with the second central node;
set a first limit associated with the detected environmental characteristics when automatically configuring the wireless sensor node;
set a second limit associated with the detected environmental characteristics differing the first limit when automatically configuring the wireless sensor node;
notify the first central node when the detected environmental characteristics exceed the first limit; and
notify the second central node when the detected environmental characteristics exceed the second limit.

11. The system of claim 10 wherein the first central node is associated with a first shipping container, and the second central node is associated with a second shipping container.

12. The system of claim 10 wherein the first central node memory stores further instructions that cause the first central node processor to:
transmit the data indicative of the environmental characteristics to the second central node.

13. The system of claim 10 wherein the sensor node memory stores further instructions that cause the sensor node processor to:
transmit data indicative of the detected environmental characteristics to the first central node; and
transmit data indicative of the detected environmental characteristics to the second central node.

14. The system of claim 10 wherein the sensor is configured to detect environmental characteristics including at least one of time, weight, pressure, temperature, humidity, light, mildew, radiation and chemical presence.

15. A plurality of wireless sensor nodes to monitor environmental characteristics each sensor node comprising:
a sensor that detects environmental characteristics;
a sensor node processor that executes instructions; and
a sensor node memory that stores instructions that cause the sensor node processor to:
register with a first central node via direct wireless communications with the first central node without use of intermediate sensor nodes to relay information;
automatically configure the wireless sensor node based at least in part on wireless communications with the first central node;
register with a second central node via direct wireless communications with the second central node without use of intermediate sensor a information;
automatically reconfigure the wireless sensor node based at least in part on wireless communications with the second central node;
detect environmental characteristics
set a first limit associated with the detected environmental characteristics when automatically configuring the wireless sensor node;
set a second limit associated with the detected environmental characteristics differing from the first limit when automatically reconfiguring the wireless sensor node;
notify the first central node when the detected environmental characteristics exceed the first limit; and
notify the second central node when the detected environmental characteristics exceed the second limit.

16. The plurality of wireless sensor nodes of claim 15 wherein each sensor node memory stores further instructions that cause the sensor node processor to:
transmit data indicative of the detected environmental characteristics to the first central node; and
transmit data indicative of the detected environmental characteristics to the second central node.

17. The plurality of wireless sensor nodes of claim 15 wherein each sensor is configured to detect environmental characteristics including at least one of time, weight, pressure, temperature, humidity, light, mildew and chemical presence.

* * * * *